United States Patent [19]

James et al.

[11] 4,045,615

[45] Aug. 30, 1977

[54] MONOBUS INTERFACE CIRCUIT USING OPTO-COUPLED HYBRIDS

[75] Inventors: Dennis Bryan James, Rumson; Chao Kai Liu, Matawan; Douglas Charles Smith, Rumson, all of N.J.

[73] Assignee: Bell Telephone Laboratories, Incorporated, Murray Hill, N.J.

[21] Appl. No.: 688,787

[22] Filed: May 21, 1976

[51] Int. Cl.² .......................................... H04M 3/56
[52] U.S. Cl. .......................... 179/1 CN; 179/18 BC
[58] Field of Search ........... 179/1 CN, 18 BC, 170 R, 179/170 NC, 99

[56] References Cited

U.S. PATENT DOCUMENTS

| | | | |
|---|---|---|---|
| 3,772,514 | 11/1973 | Sunderland | 250/217 S |
| 3,824,344 | 7/1974 | James | 179/1 CN |
| 3,991,279 | 11/1976 | Morgan | 179/18 BC |

Primary Examiner—Kathleen H. Claffy
Assistant Examiner—Joseph A. Popek
Attorney, Agent, or Firm—David H. Tannenbaum

[57] ABSTRACT

In order to reduce the signal loss in a telephone line switching and conferencing system there is interposed between each line and the switching matrix a monobus port circuit arranged to convert a transmitted telephone signal into an equivalent current source. An opto-coupled hybrid replaces the port circuit transformer and serves to provide the desired voltage to current conversion. The currents from several monobus circuits are added in a bus resistor before distribution back to the individual monobus circuits as a voltage where the original signal is subtracted from the bus signal. The resultant signal is transmitted to the telephone receiver via the opto-coupled hybrid. When the switching matrix crosspoint resistance is negligible, the component of the bus voltage measured at the current source output which results from current generated from each port circuit is equal and opposite in magnitude to the voltage generated in the port circuit. In any given line these voltages cancel each other, thereby eliminating the feedback signal.

4 Claims, 3 Drawing Figures

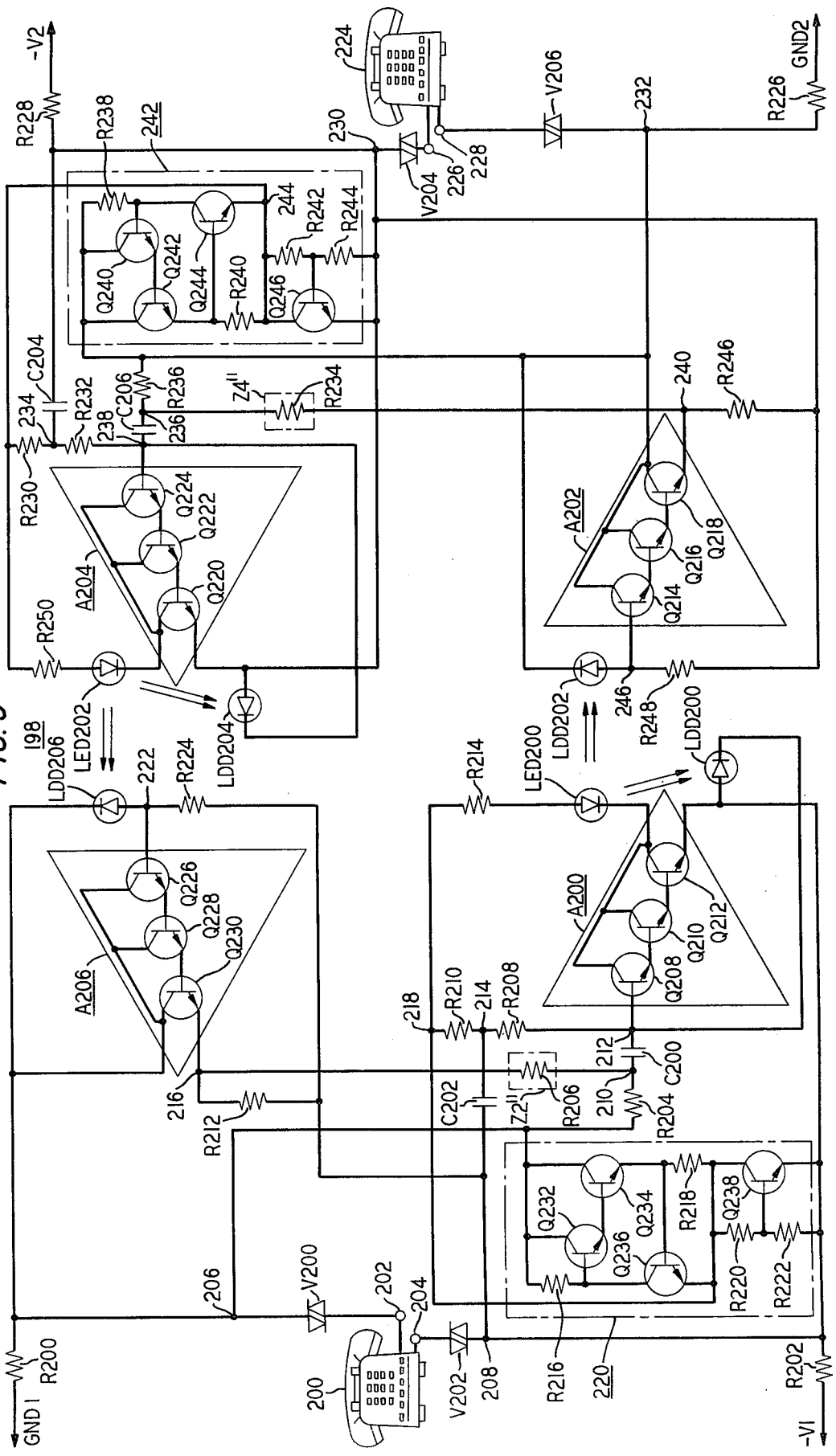

4,045,615

MONOBUS INTERFACE CIRCUIT USING OPTO-COUPLED HYBRIDS

FIELD OF THE INVENTION

This invention relates to telephone conferencing and transmission systems and, more particularly, to a port circuit useful for reducing the signal loss on switching and conference connections.

BACKGROUND OF THE INVENTION

When it is desired to conference a number of telephone lines it is customary to use 4-wire operation where the transmit and receive communication signals are on individual wire pairs. The wire pairs from each line are then selectively interconnected through a common amplifier by a switching matrix with the crosspoints of such matrix having the capability of switching all four wires of each line. Such a switching matrix when constructed electromechanically is inherently bulky and when electronics are used to reduce the size the need for four crosspoints per line circuitry becomes prohibitively expensive.

Two-wire conferencing is possible with series and parallel negative impedance, however, the negative impedance must be changed for different conference sizes and configurations. Control of the negative impedance can be awkward.

Another problem exists when three or more telephones are connected together in conference fashion with no special conferencing circuitry. In such a situation a loss of signal strength is experienced compared with the signal strength in a typical two telephone connection. As each additional telephone station is added to the conference the signal strength is reduced proportionately. When the crosspoints of the switching matrix have zero resistance, the loss in signal strength is caused by the additional impedance load of each added telephone station.

One arrangement for solving these problems is disclosed in U.S. patent application Ser. No. 580,292 filed May 23, 1975 by D. J. Morgan and D. C. Smith, now U.S. Pat. No. 3,991,279. In the Morgan et al disclosure there is shown a monobus port circuit interposed between a transmission line and a switching matrix.

The interface circuit is a current source arranged to provide the current equivalent of the voltage signal available from the transmission source. One bus resistor is supplied by the switching matrix and is shared in common by the monobus circuits serving the other connected transmission lines. In this manner the current signal generated by the port circuit current source is converted to a voltage signal by flowing through the common bus resistor. This bus voltage signal is supplied via the switching matrix to each connected port circuit.

When the switching matrix crosspoint resistance is negligible, the component of the bus voltage measured at the current source output which results from current generated from each port circuit is equal and opposite in magnitude to the voltage generated in that port circuit. In any given port circuit these voltages cancel each other, thereby eliminating the feedback signal.

Since for unbalanced operation the output from each port can be a single wire, the switching matrix is reduced to one device per crosspoint without inherently limiting the number of lines which can be interconnected concurrently.

One problem with such a monobus port circuit is that a transformer and hybrid is necessary to interface the telephone line and the voltage to current conversion circuitry. Thus, while the current conversion and feedback signal cancellation circuits are electronic in nature the actual telephone line transformer interface is bulky and relatively expensive.

SUMMARY OF THE INVENTION

Such a problem has been overcome in an illustrative embodiment of our invention where an optocoupled bidirectional circuit replaces the port circuit transformer and serves also to provide the desired voltage to current conversion. The opto-coupler uses an LED coupled with a pair of diodes arranged in the manner taught in U.S. patent application Ser. No. 548,404 filed Feb. 10, 1975 by S. G. Waaben, now abandoned and replaced by continuation-in-part application Ser. No. 710,562. The diode pairs serve to provide stability for the circuit parameters and since the interface between the telephone line and the monobus then becomes entirely optical in nature low-loss optical paths can be used to couple the two portions of the port circuit.

We have recognized that the optically coupled circuit shown in the Waaben disclosure provides a voltage to current conversion directly within the interface and we have taken advantage of that conversion by providing the converted current signal directly to the balanced bridge network of the monobus where one resistive leg of the bridge is shared in common by all of the connected port circuits.

BRIEF DESCRIPTION OF THE DRAWING

These and other objects and features will be more fully understood from a review of the drawing, in which:

FIG. 3 shows an embodiment of the opto-coupled circuit as disclosed by the aforementioned Waaben disclosure.

GENERAL DESCRIPTION

Figure 2:
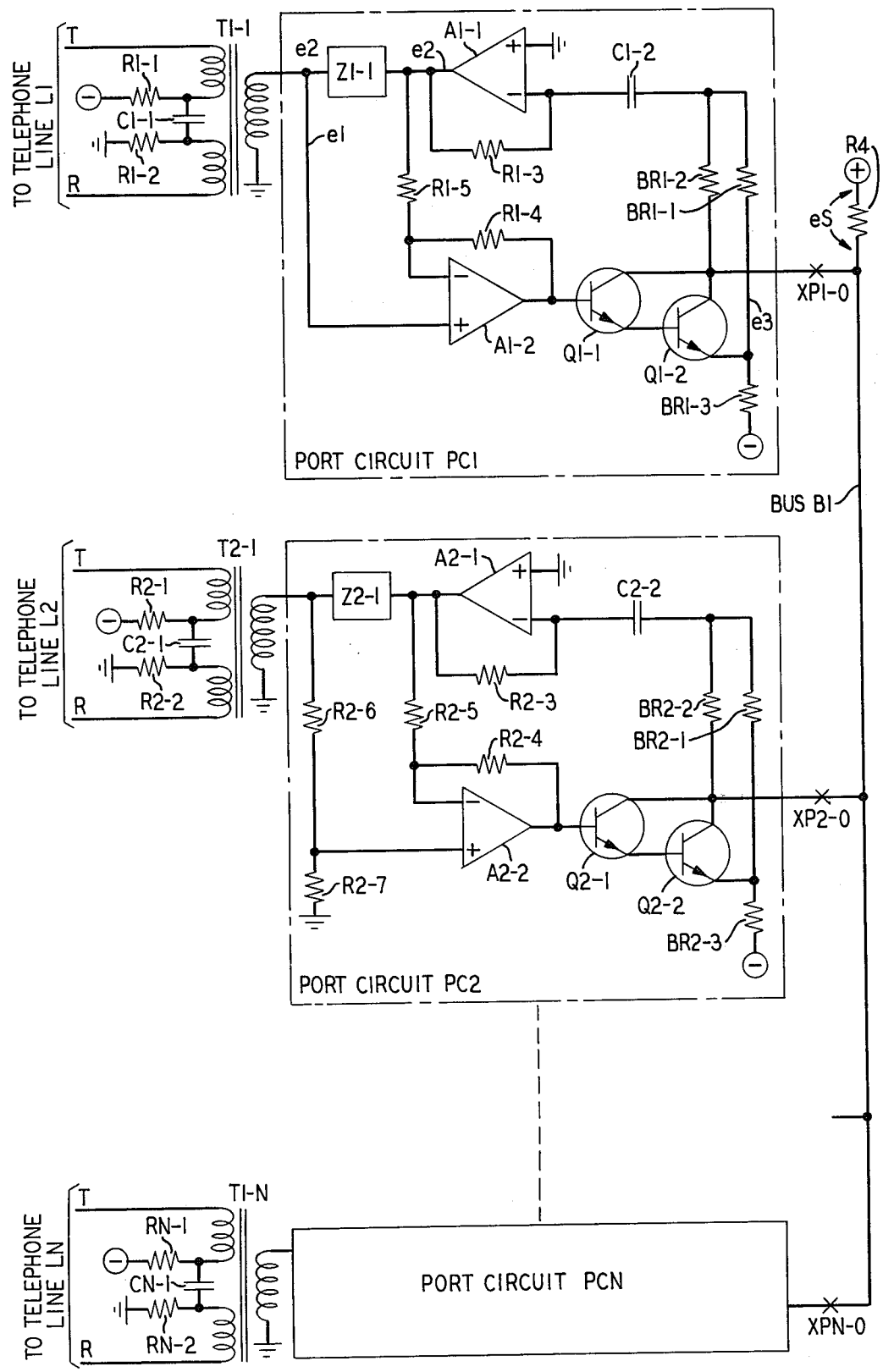
FIG. 2 shows an embodiment of the port circuit as disclosed by the aforementioned Morgan-Smith disclosure.

In the following discussion the letter $i$ used in conjunction with the description of FIG. 2 designates the number of any particular port circuit. Thus, amplifier A$i$-1 associated with port circuit PC1 is the notation for amplifier A$l$-1; FIG. 2. Similarly, the Q$i$-1 transistor associated with port circuit PC2 is shown in port circuit PC2 as transistor Q2-1.

Figure 1:
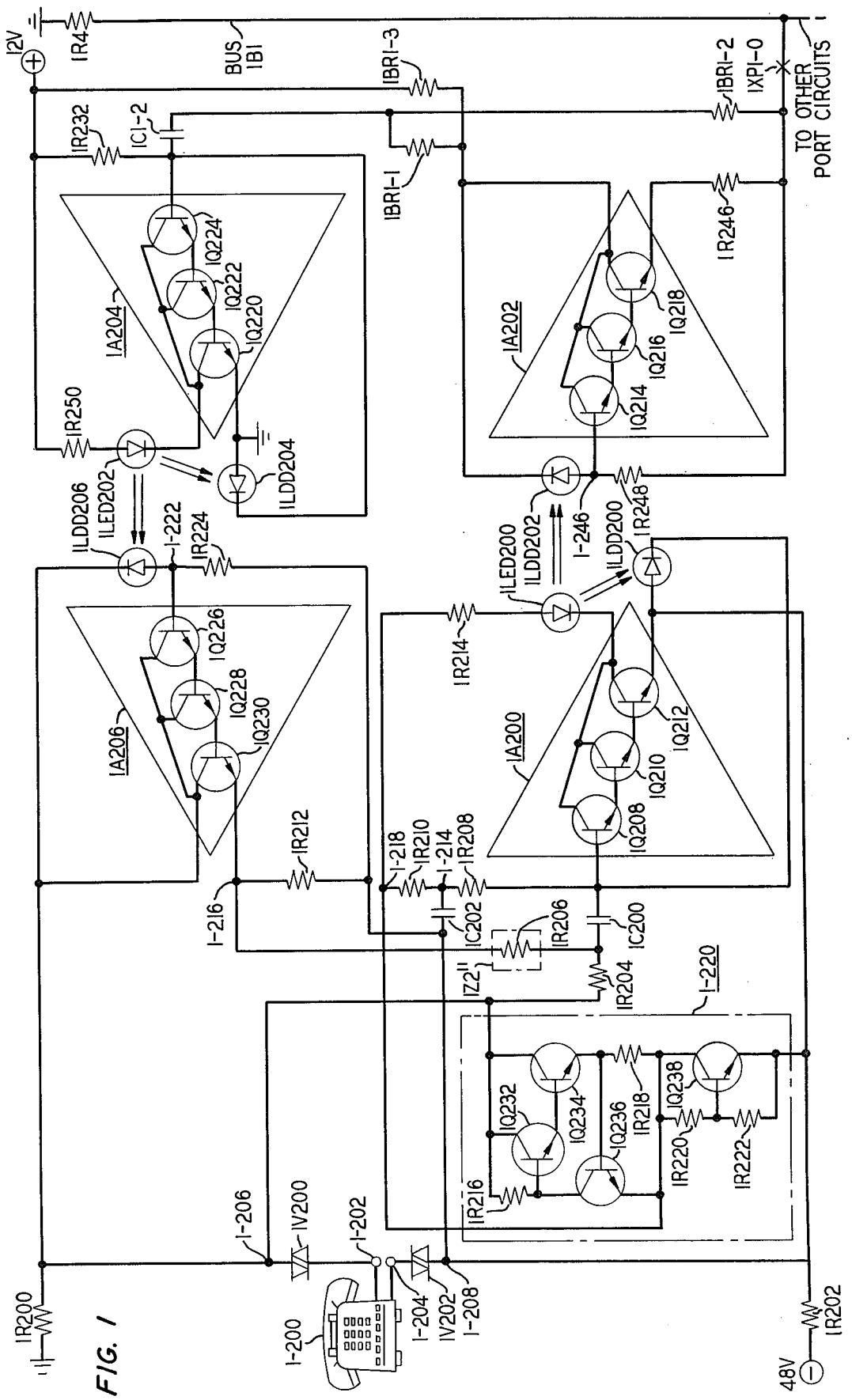
FIG. 1 shows one embodiment of our port circuit for use in a single-wire bus conferencing arrangement.

Before beginning a discussion of the operation of the circuit shown in FIG. 1 it may be helpful to review both the monobus port circuit disclosed by the aforementioned Morgan-Smith disclosure which is shown in FIG. 2 as well as the opto-coupled hybrid circuit shown in FIG. 3 and disclosed in the aforementioned Waaben disclosure.

As shown in FIG. 2, each port circuit, in response to signal transmission voltage over the associated telephone line, such as telephone line L1, transmits a signal to bus B1 as a signal current from the current source comprised of transistors Q$i$-1 and Q$i$-2. The resultant signal voltage, shown as voltage $e_s$ on bus B1 is the sum of all signal currents multiplied by resistor R4. In each port circuit, amplifier A$i$-1 subtracts the port circuit's own contribution to the bus signal and applies the amplified result to the telephone line through $Zi$-1 and $Ti$-1. Operational amplifier $Ai$-2 along with associated components $Zi$-1, $Ri$-5 and $Ri$-4 constitute an electronic hybrid of the type disclosed in U.S. Pat. No. 3,824,344 issued to Dennis B. James and James R. McEowen on July 16, 1974. This hybrid separates the directions of transmission from the telephone set into two separate paths, i.e., the transmit path from the output of amplifier $Ai$-2 and the receive path from the output of amplifier $Ai$-1.

The purpose of the monobus circuit is to recombine the two transmission paths onto a single wire while at the same time maintaining 4-wire transmission, i.e., separate and distinguishable channels for received and transmitted signals. This is accomplished by separating the directions of transmission as voltage signals or current signals on the same wire.

Transmission From a Port to the Bus

In order to establish a conference, several ports are connected to a bus which is terminated by resistor R4. Each port presents a high impedance to the bus and consists of a current source and a voltage amplifier. A signal voltage at the base of transistor $Qi$-1 appears at the emitter of transistor $Qi$-2 as voltage $e3$. This results in a signal current applied to bus B1 having a value of $e3/BRi$-3.

If resistor R4 is made equal to resistor $BRi$-3 a resultant signal, $es$, equal to $-e3$ appears on the bus across resistor R4. The total current through resistor R4 at any time is the sum of the contributions from all ports. Thus, $es$ is equal to the negative of the sum of the $e3$'s from each port. In this manner each port transmits a signal to the bus as a signal current.

Transmission from the Bus to a Port

Operational amplifier $Ai$-1 and associated components, $Ri$-3, $Ci$-2, $BRi$-1 and $BRi$-2, form the voltage amplifier for the receive path. This amplifier senses bus signal voltage and delivers it to the port hybrid. Resistor $BRi$-1 serves to cancel out the port's own contribution to signal $es$, so that signal $e2$ comprises those signals contributed by other ports only. Resistor $BRi$-2 is connected from the bus to the virtual ground at the input node of amplifier $Ai$-1 and thus the impedance seen looking into the port from bus B1 is $BRi$-2 in parallel with the composite collector impedance of transistors $Qi$-1 and $Qi$-2. This impedance is approximately equal to the value of resistor $BRi$-2. If resistor $BRi$-2 is much larger than resistor R4, the signal levels are not noticeably affected as new ports are added to a conference. Thus, using the monobus technique just described, many ports can be added to a conference with low loss.

DC Voltage Protection

Capacitor $Ci$-2 breaks the dc feedback loop in the port circuit insuring low frequency stability and a low offset voltage in amplifier $Ai$-1. In addition, if a pure resistance is used for resistor R4, the dc voltage on bus B1 varies with the number of ports since each port draws dc as well as signal current through resistor R4. Capacitor $Ci$-2 also prevents the dc bus voltage from saturating amplifier $Ai$-1.

Stability for Conferencing

The stability of large conferences can be improved by adjusting the ratio of resistor $BRi$-2 to resistor R4. By lowering this ratio the bus is loaded down in a controlled manner as new ports are added to a conference, by the paralleling of the $BRi$-2 resistors with resistor R4, thereby giving a lower effective value of resistor R4. This lowers the ac gain and injects negative feedback in increments as more ports are added to the conference. For instance, if the ratio of resistor $BRl$-1 to resistor R4 is 25, then the gain is reduced approximately 0.4dB for each new port added.

Opto-Coupled Hybrid

Now referring to FIG. 3 there is illustrated a detailed embodiment of an optically coupled bidirectional communication system 198 which utilizes Darlington-type circuit amplifiers as described above. System 198 comprises two light-emitting diodes LED200 and LED202, four light-detecting diodes LDD200, LDD202, LDD204 and LDD206, and four amplifiers A200, A202, A204 and A206. The bidirectional coupler serves to interconnect stations 200 and 224.

Each of the aforesaid amplifiers comprises three junction transistors in which the collectors are all coupled together and the emitter of each first transistor is coupled to the base of each second transistor and the emitter of each second transistor is coupled to the base of each third transistor. The three transistors of A200 are Q208, Q210 and Q212. The three transistors of A202 are Q214, Q216 and Q218. The three transistors of A204 are Q220, Q222 and Q224. The transistors of A206 are Q226, Q228 and Q230. The three transistors of each of the aforesaid amplifiers are connected together in what is commonly denoted as a Darlington-type configuration.

One or two of the three transistors of each of the aforedescribed amplifiers could be eliminated, still leaving functional amplifiers.

A telephone station set 200 is coupled between terminals 202 and 204, which are respectively coupled through varistors V200 and V202 to terminals 206 and 208. Terminal 206 is coupled through a resistor R200 to a first ground potential denoted as GND 1. Terminal 208 is coupled through a resistor R202 to a voltage source denoted as $-V1$.

Terminal 206 is coupled through a resistor R204 to a terminal 210. Terminal 210 is coupled to a resistor R206 (illustrated within dashed line rectangle denoted as cancellation impedance $Z2''$) and to a capacitor C200. R206 is coupled to a terminal 216 and to the emitter of Q230. C200 is coupled to terminal 212, to the base of Q208 (the input of A200), the cathode of LDD200, and to one terminal of a resistor R208. The second terminal of R208 (terminal 214) is coupled to a resistor R210 and to a capacitor C202. Capacitor C202 is coupled to terminal 208 and through a resistor R212 to terminal 216 (the emitter of Q230). R210 is coupled to terminal 218 and to a resistor R214 that is coupled to the anode of LED200. The cathode of LED200 is coupled to the collectors of Q208, Q210 and Q212. The emitter of Q212 is coupled to the anode of LDD200 and to terminal 208.

The circuitry contained within dashed line rectangle 220 comprises transistors Q232, Q234, Q236 and Q238 and resistors R216, R218, R220 and R222. The function of the circuitry within dashed line rectangle 220 is to provide at terminal 218, which is coupled to the emitter of Q236, a relatively constant dc voltage source. Terminal 206 is coupled to one terminal of R216 and to the collectors of Q232 and Q234. The second terminal of R216 is coupled to the base of Q232 and the collector of Q236. The emitter of Q232 is coupled to the base of Q234 and the emitter of Q234 is coupled to the base of Q236 and one terminal of R218. The emitter of Q236 is coupled to terminal 218, a second terminal of R218, a first terminal of R220 and the collector of Q238. The second terminal of R220 is coupled to the base of Q238 and a first terminal of R222. The second terminal of R222 and the emitter of Q238 are coupled to terminal 208.

The collectors of Q226, Q228 and Q230 are all coupled to the cathode of LDD206 and to terminal 206. The anode of LDD206 is coupled to the base of Q226, (the input of A206) terminal 222 and R224. R224 is also coupled to the second terminal of R212 and terminal 208.

LED200 is positioned with respect to LDD200 and LDD202 such that light emitted by LED200 impinges on the photosensitive areas of LDD200 and LDD202. LED202 is positioned with respect to LDD204 and LDD206 such that light emitted by LED202 impinges on the photosensitive areas of LDD204 and LDD206.

A second telephone receiver-sender unit 224 is coupled between terminals 226 and 228, which are respectively coupled to terminals 230 and 232 through varistors V204 and V206, respectively. Terminal 230 is coupled through a resistor R228 to a voltage source denoted as −V2. Terminal 232 is coupled through a resistor R226 to a ground potential denoted as GND 2. Terminal 230 is coupled through a capacitor C204 to terminal 234, and resistors R230 and R232. R232 is coupled to terminal 238, a capacitor C206, the base of Q224 (the input of A204) and the cathode of LDD204. C206 is coupled to terminal 236, resistor R234 (illustrated within a dashed line rectangle denoted as cancellation impedance Z4″) and resistor R236. While Z2″ and Z4″ are illustrated as just resistors, it is to be appreciated that an R-C series or parallel combination or other variations can be substituted to obtain relatively wide band cancellation. R234 is coupled to terminal 240, the emitter of Q218, and a resistor R246. R236 is coupled to terminal 232.

The circuitry within dashed line rectangle 242 comprises transistors Q240, Q242, Q244, Q246 and resistors R238, R240, R242 and R244. The collectors of Q240 and Q242 and one terminal of R238 are all coupled together to terminal 232. The second terminal of R238 is coupled to the base of Q240 and the collector of Q244. The emitter of Q242 is coupled to the base of Q244 and one terminal of R240. R240 is coupled to terminal 244, the emitter of Q244, the collector of Q246 and one terminal of R242. The second terminal of R242 is coupled to the base of Q246 and one terminal of R244. The emitter of Q246 is coupled to the second terminal of R244, the anode of LDD204, the emitter of Q220, and to terminal 230. Terminal 244 is coupled to R230 and a resistor R250. R250 is coupled to the anode of LED202. The cathode of LED202 is coupled to the collectors of Q220, Q222 and Q224.

The anode of LDD202 is coupled to terminal 246, the base of Q214 (the input of A202) and R248. The cathode of LED202 is coupled to terminal 232 and the collectors of Q214, Q216 and Q218. Second terminals of R246 and R248 are coupled to terminal 230.

As the receiver-sender of telephone 200 is lifted off-hook and a voice signal is impressed thereupon, the signal propagates through V200 and then through R204 and C200 to the base of Q208 (the input of A200). This signal is superimposed over the dc bias supplied through R200.

The circuitry contained within dashed line rectangles 220 and 242 serves to provide an essentially constant voltage source at terminals 218 and 244, respectively. Any fluctuations in potential which might appear at 218 and 244 are further attenuated by C202 and C204, respectively.

The input signal which reaches the base of Q208 is amplified by A200 and gives rise to a corresponding output current through LED200. LED200 emits light as a function of the current level therethrough. This light impinges upon LDD200 and LDD202. The light signal reaching LDD200 serves as a feedback signal and the light signal reaching LDD202 serves as the output signal. The current induced through LDD202 gives rise to current through R248. This causes a voltage varying signal to be developed at the base of Q214 (the input to A202) that is proportional to the voice input signal at 200. A voltage output signal from A202 appears at terminal 240. This signal is converted to current through R246, V204, and telephone receiver-sender 224. Thus a voice signal introduced into 200 is transmitted to telephone receiver-sender 244. The output signal at 232 is coupled through R236 to terminal 236. The signal appearing at the emitter of Q218 (terminal 240) of A202 is 180° out of phase from the output signal appearing at terminal 232 (the collectors of Q214, Q216 and Q218). The off-hook telephone 224 and its connecting line has an inherent impedance characteristic associated therewith. Z4″ is designed taking this impedance characteristic into account to insure that signals of substantially equal magnitude are coupled to terminal 236. The signal appearing at terminal 240 is coupled through R234 (cancellation impedance Z4″) to terminal 236. The two signals appearing at terminal 236 are 180° out of phase and substantially equal in magnitude. They therefore cancel each other and there is no input signal coupled to the base of Q224 (the input of A204) as a result of the input signal originating at 200.

There is accordingly no signal sent from LED202 to LDD206 as a result of the voice signal appearing at 200. Thus an input signal from telephone 200 is coupled to telephone 224 but is not permitted to return to telephone 200 where it originated.

As a voice signal is introduced to the telephone sender-receiver 224, A204 is activated in essentially the same way as A200 was activated when a voice signal was introduced into telephone sender-receiver 200. The voice signal is amplified by A204 and optically coupled from LED202 to LDD204 and LDD206. The resulting signal at the base of Q226 is amplified by A206 and converted into current flowing through R212, V202 and telephone receiver-sender 200. This output signal from A206 also feeds back through R204 to terminal 210. The output signal appearing at the emitter of Q230, which is 180° out of phase with the signal appearing at the collector of Q230, is fed back through R206 (cancellation impedance Z2″) to terminal 210. The telephone 200 and its connecting line has an inherent impedance characteristic associated therewith. Z2″ is designed taking into account this impedance to insure that substantially equal signals are coupled to 210. The two signals from A206 reaching terminal 210, are substantially equal in magnitude and 180° out of phase. They therefore cancel each other and thus a signal from 224 reaches 220 but is not coupled back to where it originated. Thus, a voice input signal introduced at 224 is transmitted to 200 but is not allowed to return to 224.

It is thus apparent that an input voice signal at 200 or 224 will be transmitted from one telephone to the other but will not return to the telephone from which the signal originated. System 198 provides both physical and electrical isolation between 200 and 224 and provides for the linear transfer of information between the respective telephones. Optical fibers can be utilized to couple the LEDs and the LDDs if desired. The use of low-loss high-linearity optical fibers, particularly between LED200 and LDD202 and LED202 and LDD206, permits system 198 to be used as an optical transmission system. Any transmission losses in the fibers can be made up by adjusting the gains of amplifiers A206 and A202 by changing resistors R212 and R246.

Returning now to FIG. 1, it will be noted that the elements labeled with a prefix 1 operate in the same manner as their corresponding elements of the same number (without the prefix) as shown in FIGS. 2 and 3. Thus, for example,, light-emitting diode 1LED202 functions in the same manner as does light-emitting diode LED202 shown in FIG. 3.

As shown in FIG. 1, a voltage signal transmitted from telephone station 1-200 propagates through varistors 1V200 and 1V202 to the input of amplifier 1A200 giving rise to a corresponding output current through 1LED200. As discussed, 1LED200 emits light as a function of the current level therethrough and this light impinges upon 1LDD200 and 1LDD202. The light signal reaching 1LDD200 serves as a feedback signal and the light signal reaching 1LDD202 serves as the output signal. The current induced from 1LDD202 gives rise to current through 1R248 thereby causing a signal to be developed at the base of 1Q214 which signal is proportional to the voice input signal from telephone station 1-200. An output current signal from 1A202 appears at the emitter of 1Q218 and via resistor 1R246 is available for transmission to bus 1B1 through crosspoint 1XP1-0. Note that if a number of stations were permanently connected to bus 1B1 the crosspoint would not be necessary as this crosspoint only serves to make the port circuits switchably connected to bus 1B1.

The current signal output of 1A202 is available at the collector of 1Q218 and is provided to 1BR-1 and 1BR-3 for the purpose of feedback cancellation in the manner described with reference to FIG. 2 such that the component of the voltage signal generated across bus resistor 1R4 from the port circuit shown in FIG. 1 is cancelled by the component of the voltage developed at the input of 1A204 from this same port circuit. However, the voltage signals developed across bus resistor 1R4 from any other port circuit connected to the bus are communicated to the port circuit shown in FIG. 1 via crosspoint 1XP1-0 and resistor 1BR1-2 via capacitor 1C1-2 to the input of 1A204 and via 1LED202 and 1LDD206 to 1A206 to telephone station 1-200 in the manner previously described.

Conclusion

FIGS. 2 and 3 have been combined in a manner to produce an optically coupled port circuit utilizing the principals disclosed in the aforementioned Waaben application in combination with the port circuit and transformer coupled circuit taught in the aforementioned Morgan et al. application. The resultant port circuit utilizes part of the circuitry of each of these prior applications such that any number of port circuits of the type shown in FIG. 1 may be connected together with a common bus using a common bus resistor for conferencing purposes without utilizing a transformer interface between the bus and each telephone line and without the need for an electronic hybrid of the type shown in the aforementioned U.S. Pat. No. 3,824,344 issued to D. B. James et al. July 16, 1974. Also, it should be pointed out that the principles invoked here can be advantageously applied to any circuit where analog to digital speech signal conversion takes place, such as for example, pulse code modulation systems. In each case transformers and electronic hybrids are replaced by optical circuits eliminating the need for transformers which are bulky, have large footprints and require excessive board spacing.

What is claimed is:

1. An interface circuit for use in a switching system where any number of telephone communication lines can be connected together for transmission purposes, one said interface circuit being interposed between each telephone line and a common bus, said common bus including a summing means shared in common by any interface circuit connected to said common bus, each said interface circuit including, first output current signal means for converting input voltage signals from said associated telephone line into output current signals and for communicating said converted output current signals to said common summing means, said communicated output current signals thereby being convertible into bus voltage signals by said common bus summing means, means including said input voltage converting means for applying any converted bus voltage signals to said telephone line associated therewith, means including said input voltage converting means for subtracting from said applied converted bus voltage signals any portion of said converted voltage signals which are representative of input voltage signals received over said associated telephone line, said input voltage converting means including:

a first amplifier circuit means having an output and an input;

a first light-emitting means coupled to the output of the first amplifier circuit means;

first and second light detector means, the first and second light detector means being positioned so as to receive light from the first light-emitting means;

the first and second light detector means being characterized in that incident light thereon is proportional to the current induced therethrough; and the ratio of the induced currents is essentially constant, the first light detector means being coupled to the input of the first amplifier;

second amplifier circuit means having an output and an input;

the second light detector means being coupled to the input of the second amplifier circuit means;

the output of said second amplifier connectable to said common bus and to said subtracting means;

said telephone line applying means including:

third amplifier circuit means having an input and an output;

a second light-emitting means coupled to the output of the third amplifier circuit means;

third and fourth light detector means, the third and fourth light detector means being positioned so as to receive light from the second light-emitting means;

the third and fourth light detector means being characterized in that incident light thereon is proportional to the current induced therethrough and the ratio of the induced currents is essentially constant;

the third light detector means being coupled to the input of the third amplifier circuit means, fourth amplifier circuit means having an output and an input; and wherein said fourth light detecting means is coupled to the input of said fourth amplifier circuit means, and the output of said fourth amplifier circuit means connectable to said telephone line.

2. The invention set forth in claim 1 wherein said first and third amplifier circuit means are each arranged to receive two input signals and wherein when equal input signals are present at said input there is essentially no output signal from said amplifier means receiving said equal input signals.

3. The invention set forth in claim 1 wherein said output current signal means is a balanced high impedance bridge.

4. A conferencing system arranged for interconnecting a plurality of telephone lines, said conferencing system comprising a plurality of port circuits each associated with one of said telephone lines, a common bus including means for converting current signals on said bus to a composite bus voltage signal, means for selectably connecting any of said port circuits to said common bus, each said port circuit including:

first output current means for converting input voltage signals from said associated telephone line into output current signals and for communicating said converted output current signals to said bus converting means, said communicated output current thereby being convertible into bus voltage signals by said bus converting means, means including said input voltage converting means for applying any converted bus voltage signals to said telephone line associated therewith, means including said input voltage converting means for subtracting from said applied converted bus voltage signals any portion of said converted voltage signals which are representative of input voltage signals received over said associated telephone line, said input voltage converting means including:

a first amplifier circuit means having an output and an input;

a first light-emitting means coupled to the output of the first amplifier circuit means;

first and second light detector means, the first and second light detector means being positioned so as to receive light from the first light-emitting means;

the first and second light detector means being characterized in that incident light thereon is proportional to the current induced therethrough; and the ratio of the induced currents is essentially constant, the first light detector means being coupled to the input of the first amplifier;

second amplifier circuit means having an an output and an input;

the second light detector means being coupled to the input of the second amplifier circuit means;

the output of said second amplifier circuit means being connected to said common bus and to said subtracting means;

said telephone line applying means including:

third amplifier circuit means having an input and an output;

a second light-emitting means coupled to the output of the third amplifier circuit means;

third and fourth light detector means, the third and fourth light detector means being positioned so as to receive light from the second light-emitting means;

the third and fourth light detector means being characterized in that incident light thereon is proportional to the current induced therethrough and the ratio of the induced currents is essentially constant;

the third light detector means being coupled to the input of the third amplifier circuit means, fourth amplifier circuit means having an output and an input; and wherein said fourth light detecting means is coupled to the input of said fourth amplifier circuit means, and the output of said fourth amplifier circuit means connected to said telephone line.

* * * * *